ly Patent

United States Patent [19]
Murakami et al.

[11] 4,329,034
[45] May 11, 1982

[54] CAMERA WITH PROGRAM SYSTEM

[75] Inventors: Hiroyasu Murakami, Tokyo; Masanori Uchidoi, Yokohama; Masayoshi Yamamichi, Kawasaki; Nobuhiko Shinoda; Masayuki Suzuki, both of Tokyo; Tadashi Ito, Yokohama, all of Japan

[73] Assignee: Canon Kabushiki Kaisha, Tokyo, Japan

[21] Appl. No.: 175,950

[22] Filed: Aug. 7, 1980

[30] Foreign Application Priority Data

Aug. 7, 1979 [JP] Japan ................... 54-100585

[51] Int. Cl.³ .............................................. G03B 7/087
[52] U.S. Cl. .......................................... 354/37; 354/38
[58] Field of Search ............................ 354/28–30, 354/230, 36–38, 43, 44, 46, 50, 51, 196, 286

[56] References Cited

U.S. PATENT DOCUMENTS

| Re. 29,276 | 6/1977 | Mitani et al. | 354/46 |
| 4,106,033 | 8/1978 | Nakamoto et al. | 354/23 D |
| 4,174,160 | 11/1979 | Nanba et al. | 354/38 X |

*Primary Examiner*—L. T. Hix
*Assistant Examiner*—William B. Perkey
*Attorney, Agent, or Firm*—Toren, McGeady and Stanger

[57] ABSTRACT

In the disclosed camera, an exposure value determining arrangement produces an electrical signal in response to a light measuring facility and a film sensitivity setting device. An exposure factor unit determines a combination of shutter speed and aperture value for a proper exposure in response to the exposure value determining arrangement. A control connected to the exposure factor unit varies the combination of exposure factors in the exposure factor unit in response to the set position of a program constant setting arrangement which is set for a particular program constant.

8 Claims, 6 Drawing Figures

4,329,034

CAMERA WITH PROGRAM SYSTEM

BACKGROUND OF THE INVENTION

This invention relates to a camera, particularly with a program system that selects a suitable shutter and aperture for particular conditions.

Cameras with such programs are known. Such cameras select only one combination of shutter time and aperture on the basis of the EV value and film sensitivity. This combination is invariable for a particular film sensitivity and object brightness. Hence, it is impossible to select the shutter time or aperture value. Of course, aperture priority systems or shutter priority systems are available. However, these are quite complicated, costly, and cannot simply be adopted for inexpensive cameras.

Applicants have proposed one method of solving this problem by providing means for optionally varying the output of the exposure value determining means that establishes the relationship between the shutter time and the aperture value. However, this system involves use of an up-down counter for varying the relationship between the shutter time and the aperture value. If several pictures are to be taken with varied programs, it is necessary to keep the power switch closed in order to maintain the content of the up-down counter while the pictures are taken. This results in excessive consumption of electric power.

SUMMARY OF THE INVENTION

An object of the invention is to avoid the aforementioned disadvantages.

Another object of the invention is to produce a camera with a program system free of the aforementioned inconveniences of conventional devices.

Still another purpose of the invention is to offer a camera with a program system having control characteristics adapted for the type of interchangeable lens used with the camera.

The various features of novelty characterizing the invention are pointed out in the claims. Other objects and advantages of the invention will be obvious from the following detailed description when read in light of the accompanying drawings.

DESCRIPTION OF THE PREFERRED EMBODIMENT

Figure 1:
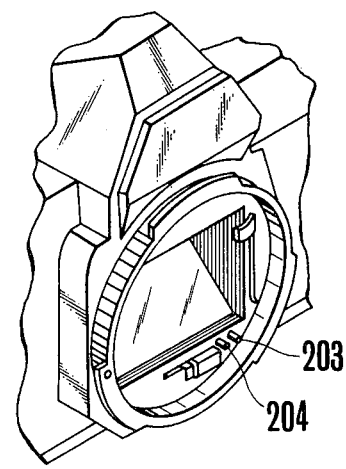
FIG. 1 is a perspective view of a camera with a program system embodying features of the present invention.

FIG. 1 shows the front part of the camera of program system in accordance with the present invention in perspective view. A pin 203 is inserted in the hole provided in the lower part of the wall of the mirror box, the one end of which pin is fixed at the one end of the F value signal lever to be explained later. A pin 204 is inserted in the hole provided in the lower part of the wall of the above mirror box, the one end of which pin is fixed at the one end of the focal length signal lever to be explained later.

Figure 2:
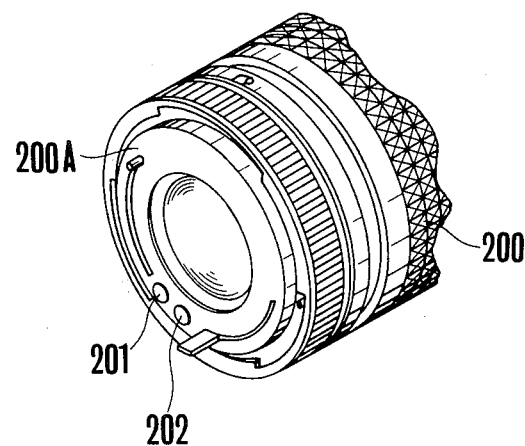
FIG. 2 is a perspective view of an interchangeable lens to be used with the camera shown in FIG. 1.

FIG. 2 shows the interchangeable lens to be used with the camera shown in FIG. 1 in perspective view. In the drawing, 200 is the interchangeable lens body, on the end 200A of which lens the signal pin 201 to be engaged with the pin 203 shown in FIG. 1 so as to move the pin 203 in the camera body by a length corresponding to the F value when the lens is mounted on the camera body and the signal pin 202 to be engaged with the pin 204 shown in FIG. 1 so as to move the pin 204 in the camera body by a length corresponding to the focal length of the lens are provided. Hereby, the smaller the F value is, the larger the signal pin 201 is, while the larger the focal length is, the larger the signal pin 202 is.

Figure 3:
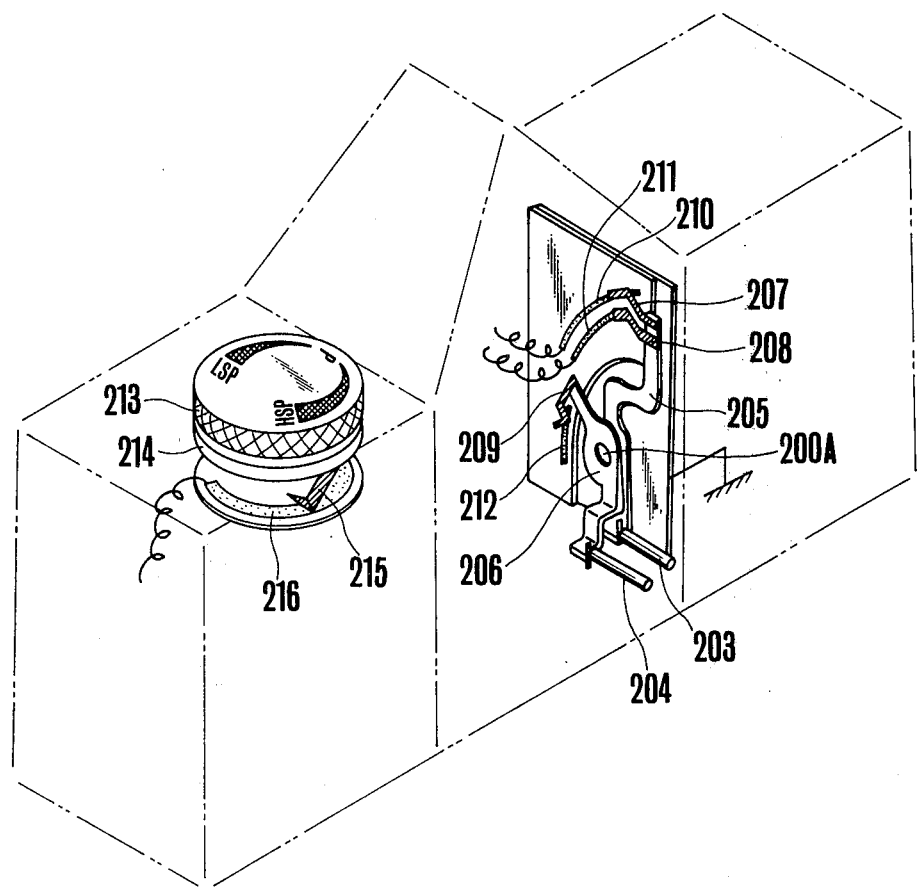
FIG. 3 is a perspective view of portions of the camera in FIG. 1.

The above-mentioned pin 203 is fixed at the one end of the F value signal lever as mentioned above, whereby the lever 205 is movably mounted on the shaft 200A as is shown in FIG. 3, being normally urged along the counterclockwise direction by means of a return spring not shown in the drawing. At the other end of the lever 205 a brush in movable contact with a resistance 210 fixed on the base plate fixed on the wall surface of the mirror box and a brush in movable contact with the resistance 211 fixed on the base plate are fixed. Further, the focal length signal lever 206 on which the pin 204 shown in FIG. 1 is fixed is mounted on the shaft 200A as is shown in FIG. 3, being normally urged along the counterclockwise direction in the same way as in case of the lever 205. Further, at the other end of the lever 206 a brush in movable contact with the resistance 212 provided on the base plate is fixed in the same way as in case of the lever 205.

The dial 213 provided on the upper part of the front part of the camera shown in FIG. 3 is the mechanical program constant setting dial for changing the predetermined combination of the aperture value with the shutter time until the desired combination is obtained in accordance with the object brightness and the film sensitivity. At the lower part of the dial 213, a holding disc 214 is fixed for holding the slide brush 215 in movable contact with the program constant variable resistance 216.

Figure 4:
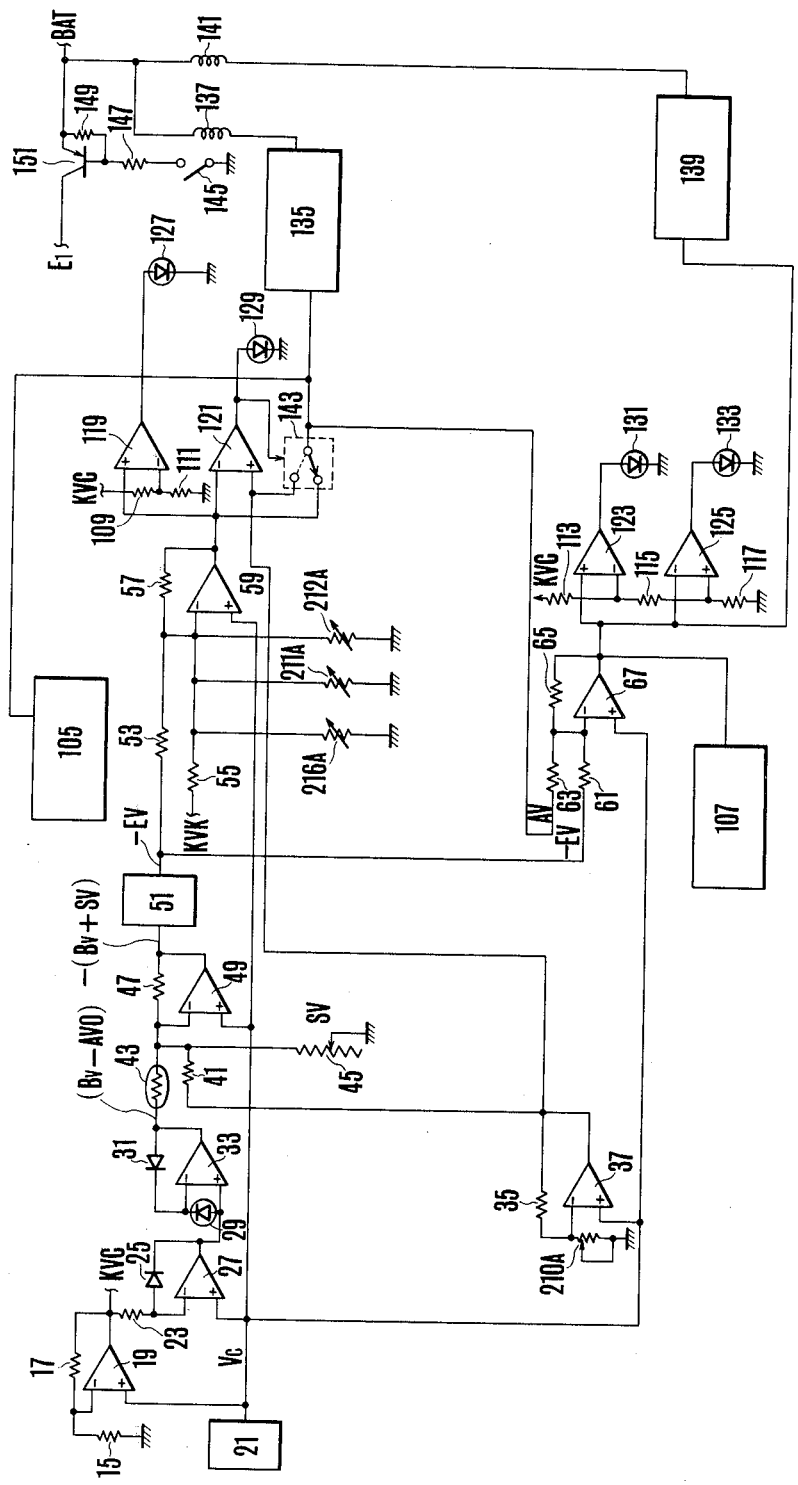
FIG. 4 is a partially block and partially schematic diagram illustrating a circuit in the camera of FIG. 1.

FIG. 4 shows an embodiment of the exposure control circuit of the camera shown in FIG. 1. In the drawing, a resistance 15 has one end grounded and the other end connected to the inverting input of an operational amplifier 19 for forming a constant voltage circuit. A resistance 17 is connected in the feed back circuit of the amplifier. A constant voltage source 21 produces a constant voltage VC, and is connected to the non-inverting input terminals of the amplifiers 19, 27, 37, 49, 59, 67. A resistance 23 and a diode 25 form a temperature compensation circuit together with the above amplifier 27. A silicon photocell 29 forms a light measuring circuit, and a logarithmically compressing diode 31 is connected across an amplifier 33. A resistor 210A establishes an F value (hereinafter called AVO) and is composed of a setting variable resistance 210 and a brush 207 as shown in FIG. 3. The smaller the AVO, the larger is the value of the resistance 210A. A resistor 35, an amplifier 37 and a resistor 41 form a circuit for supplying the AVO signal from the resistance 210A to a calculation circuit to be explained.

A temperature compensation element 43 is connected to the output terminal of the above light measuring circuit. The circuit further includes a film sensitivity (SV) setting variable resistance 45, a resistor 47 and an amplifier 49 for forming a signal inverting a storage circuit 51 such as a capacitor for storing the voltage corresponding to $-(BV+SV)=-EV$, and three resistors 53, 55, and 57 and an amplifier 59 for forming an AV determining circuit to determine the aperture value AV in accordance with EV and the program constant setting circuit. Three resistors 61, 63, and 75, and an amplifier 67 form the TV determining circuit to determine the shutter time TV in accordance with the values EV and AV. The AV determining circuit and the TV determining circuit form the exposure value determining circuit.

Figure 5:
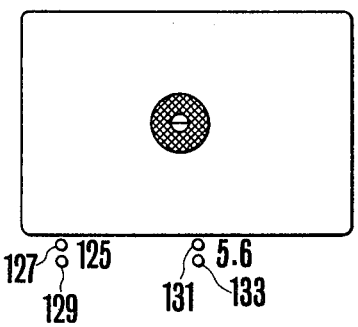
FIG. 5 shows the enlargement of the view finder of the camera shown in FIG. 1.

Member 105 is the display device including an A/D converter and a display unit for displaying the value digitally, after the analog signal from the amplifier 59 is converted into digital signal, whereby the value is displayed at the lower part at the right side of the view finder frame as is shown in FIG. 5. 107 is the display device including an A/D converter and the display unit for displaying the value digitally after the analog signal corresponding to the shutter time TV from the amplifier 69 is converted into digital signal, whereby the value is displayed at the lower part at the left side of the view finder frame as is shown in FIG. 5.

Members 109-117 are the resistances for forming the voltage dividing circuits, while 119-125 are the comparators. The output terminal of the comparator is connected to the voltage dividing circuit formed with 109 and 111 in such a manner that the level is high (hereinafter called 1) when the output signal from the amplifier 59 represents an aperture value larger than F=16 in case the photographing lens to be used is set at the largest aperture value, said F=16. The output terminal of the comparator 121 delivers "1" when the output signal of the operational amplifier 59 represents an aperture value larger than AVO of the photographing lens. The output of the comparator 123 is connected to the voltage dividing circuit consisting of 113, 115 and 117 in such a manner that the level is "1" when the output signal of the amplifier 67 represents TV beyond 1/1000 sec. in case the shortest shutter time of the camera to be used, say 1/1000 sec. is set. The output terminal of the comparator 125 is connected to the voltage dividing circuit consisting of 113, 115 and 117 in such a manner that the level is "1" when the output signal of the amplifier 67 represents the shutter time TV beyond 1/30 sec. in case the longest shutter time of the camera to be used, said 1/30 sec. is set.

Elements 127-133 are the light emitting diodes (hereinafter called LED), being arranged at the determined positions in the view finder as is shown in FIG. 5. 135 and 137 are the aperture control circuit and the coil of the magnet constituting a conventional aperture control device, 139 and 141 the shutter time control circuit and the tail shutter curtain control magnet constituting a conventional shutter time control device and 143 the change over switch to be changed over out of the position in a rigid line into that in a dotted line when the output of the comparator 121 becomes "1." Although the change over switch 143 consists of a semi-conductor element in practice, a mechanical switch is shown in the drawing for the sake of the easy comprehension. 145-151 are the switch, the two resistances and a pnp transistor for constituting a voltage supply circuit. Further, in FIG. 4, KVC is the voltage input terminal connected to the output terminal of the above voltage supply circuit, BAT the terminal to be connected to the battery (not shown in the drawing) and $E_1$ the terminal for delivering the driving voltage to the circuit such as the amplifiers, the comparators and so on in FIG. 4. 211A is the resistance consisting of the resistance 211 and the brush 208 in FIG. 3, whereby the larger the value is, the smaller the AVO of the photographing lens to be used is. 212A is the resistance consisting of the resistance 212 and the brush 209 in FIG. 3, whereby the larger the focal length of the photographing lens to be used is, the larger the value of the resistance is. 216A is the resistance consisting of the above brush 215 operatively connected to the program constant setting dial and the resistance 216 in contact with the brush 215 in FIG. 3.

Before the operation of the camera constructed as mentioned above in accordance with FIGS. 1 to 5, the program characteristic diagram shown in FIG. 6 which represents the combination of the shutter time with the aperture value will be explained below.

Figure 6:
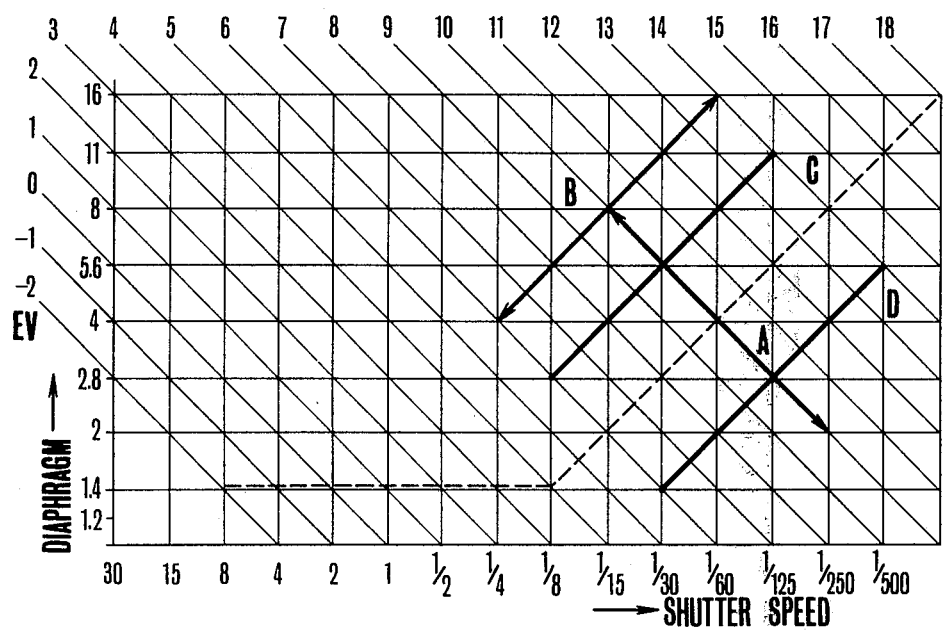
FIG. 6 shows the program characteristics of the combination of the shutter time with the aperture value.

In FIG. 6, the abscissa shows the shutter time from 30 sec. to 1/1000 sec., while the ordinate shows the aperture value from F=1.2 to F=16. The inclined lines show the EV value from EV $-2$ to EV 18 in $-2$ to 18, whereby the dotted line shows the programmed relation between the shutter times and the aperture values, while the rigid line A shows the relation between the aperture value and the shutter speed when the photographer compulsorily changes the combination decided with EV value, between the shutter time and the aperture value and the rigid line B shows the relation between the shutter time and the aperture value in case the object brightness changes before taking a picture after the photographer compulsorily changes the relation between the aperture value and the shutter time in the same way as in the above-mentioned case.

When the power source switch 145 shown in FIG. 4 is closed in operative engagement with the release button not shown in the drawing, a certain determined voltage is delivered from the terminal $E_1$ so as to make each circuit ready for operation. Thus, the light measuring circuit starts to operate so as to produce a signal corresponding to (BV−AVO) at the output terminal of the amplifier 33. At the resistance 45 the sensitivity SV of the film to be used is set, while at the resistance 210A the AVO is automatically set when the lens shown in FIG. 2 has been mounted on the camera body shown in FIG. 1, so that the output signals from these resistances are calculated in the amplifier 49 into a signal corresponding to $-(BV+SV)=-EV$ to be delivered from the output terminal.

Hereby, the value of the resistance 55 has been set in such a manner that when the store circuit 51 produces a signal $-EV$, the output of the amplifier 59 is $AV=-(EV/2)-1$, so that when at the output terminal of the store circuit 51 an output signal $-EV$ appears, the output signal of the amplifier 59 is applied to the amplifier 67 through the change-over switch 143 and the resistance 63 so as to be calculated with a signal corresponding to $-EV$ input through the resistance 61 and delivered from the output terminal of the amplifier 67 as signal corresponding to $-(AV-EV)=TV$. The analog signals AV and TV produced with the amplifiers 59 and 67 are converted in digital signals by means of the display devices 105 and 107 and then digitally displayed in the view finder as is shown in FIG. 5. So far, the process is the same as in case of the conventional program shutter. However, in case the AV and the TV displayed in the view finder are not the values desired by the photographer, the mechanical program constant setting dial 213 shown in FIG. 3 is rotated.

Now, let us suppose that the dial 213 is rotated by a certain determined amount in such a manner that the output of the amplifier 59 is AV=(EV/2)+1 and the aperture value is shifted by two steps. Namely, let us suppose that with the rotation of the dial the output of the amplifier 59 is shifted to F=8. In case the aperture value which is the output of the amplifier is shifted as mentioned above, the output signal of the amplifier 67 for producing the shutter time is also shifted by two steps.

To explain the above in accordance with FIG. 6, along with the rotation of the program constant setting dial 213 the combination of the TV with the AV is moved along the rigid line A shown in FIG. 6. When the output signals of the amplifiers 59 and 67 are shifted by two steps as mentioned above, the values displayed in the view finder are also shifted by two steps accordingly. When the above displays in the view finder reach the TV and AV desired by means of the photographer, the rotation of the above-mentioned mechanical dial 213 is stopped in such a manner that the brush 215 shown in FIG. 3 is held on the resistance 216 at the position corresponding to the amount of the rotation of the dial 213, while the aperture value signal producing amplifier 59 and the shutter time signal producing amplifier 67 continue to produce signals shifted in accordance with the amount of the rotation of the above dial 213.

When then the release button is further pushed, the aperture of the photographing lens is controlled through the control circuit 135 and the magnet 137 in accordance with the output signal of the amplifier 59, while the shutter time is controlled through the control circuit 139 and the magnet 141 in accordance with the output signal of the amplifier 67 so as to control the exposure properly.

Further, when after the combination of the AV and the TV has been changed as is explained in accordance with FIG. 6, the object brightness changes, the output −EV of the store circuit 51 changes in accordance with the change of the AV, the TV and the EV which are the outputs of the amplifiers 59 and 67 in accordance with the BT, the photograph can also be taken with the proper exposure amount.

Further, when along with the rotation of the above program constant setting dial 213 the output signal AV of the amplifier 59 represents a voltage for larger aperture value than that, for example F=16, of the voltage set by means of the voltage dividing circuit 109 and 111, the output "0" of the comparator becomes "1," whereby the LED 127 is lit so as to display that the aperture value is the largest.

Further, when the photographing lens with different totally opened F value is used, the camera of the above-mentioned embodiment operates as follows.

Namely, when such a photographing lens is mounted on the camera, the signal pin 201 on the photographing lens drives the pin 203 at the side of the camera into the camera body by a length corresponding to the totally opened F value, while the lever 205 shown in FIG. 3 is moved by the corresponding amount. Thus, the resistance 211A shown in FIG. 4 assumes a value corresponding to the totally opened F value of the photographing lens so as to change the combination of the aperture value AV and the shutter time TV in the same way as when the dial 213 is rotated.

FIG. 6 shows in the rigid line C the program curve when a photographing lens with large AVO is used. As is clear from the rigid line C, the larger the totally opened F value is, the larger the aperture value is, for example the aperture value increases from F4 up to F5.6 (hereby, EV=10). Hereby, other operations are same as when the program is changed with the dial 213, so that the explanations are omitted here.

Further, when the lens with different focal length is used, the value of the resistance 212A shown in FIG. 4 changes in accordance with the focal length of the photographing lens to be used, so that the then program curve of the camera changes as is shown with the rigid line D in FIG. 6. Hereby, the rigid line D in FIG. 6 shows the program when a lens with large focal length is used.

As is explained so far, in accordance with the present invention by adopting a mechanical dial as members for changing the program, which member automatically never returns to the initial position, it is made unnecessary to continue to close the power source switch in order to keep the changed program at the desired value as before, so that the consumption of the battery can remarkably be avoided.

Further, in accordance with the present invention, the totally opened F value is automatically set in the program control circuit in such a manner that the program curve is automatically changed in accordance with the totally opened F value, while the aperture of the lens assumes a value a little larger than the totally opened F value even when the object brightness lowers so that a picture with proper exposure can be taken over wide range.

Further, in accordance with the present invention, the focal length of the lens is also automatically set in the program control circuit in such a manner that the program is automatically changes in accordance with the focal length, while the larger the focal length is, the smaller the shutter time is, namely the larger the focal length is, the smaller the aperture value is, so that it is possible to avoid the hand vibration which often takes place when the lens with large focal length is used, which is very profitable.

What is claimed is:
1. A camera with a program system and for use with interchangeable lenses having different focal lengths, comprising:
 (a) a light measuring means for producing an electrical signal corresponding to the amount of light from an object;
 (b) a film sensitivity setting means;
 (c) an exposure value setting means for producing an electrical signal corresponding to the electrical signal from the light measuring means and the film sensitivity setting means;
 (d) an electrical exposure factor determining means for determining a combination of shutter time and aperture value in accordance with the electrical signal from the exposure value determining means so as to produce an electrical signal corresponding to the exposure factor; and
 (e) a program curve adjusting means connected to the exposure factor determining means for varying the combination of aperture value and shutter time from the exposure factor determining means in such a manner that the aperture value determined by the exposure factor determining means decreases as the focal length of the interchangeable lens mounted on the camera increases.

2. A camera according to claim 1, wherein said exposure value producing means includes an operational amplifier having an input connected to the light measuring means and the film sensitivity setting means.

3. A camera according to claim 1, wherein said electrical exposure factor determining means includes a first electrical member for producing an aperture value signal in accordance with the electrical signal from the exposure value producing means and a second electrical member for producing a shutter time value signal in accordance with the electrical signal from the exposure value producing means and the aperture value signal from the first electrical member.

4. A camera according to claim 3, wherein said first electrical member includes an operational amplifier connected to the exposure value producing means.

5. A camera according to claim 3, wherein said program curve adjusting means includes an electrical member connected to the first electrical member for varying the aperture value signal from the first electrical member in accordance with the focal length of the interchangeable lens.

6. A camera according to claim 4, wherein said program curve adjusting means includes a variable impedance member connected to the operational amplifier of the first electrical member for varying the aperture value signal from the operational amplifier in accordance with the focal length of the interchangeable lens.

7. A camera according to claim 6, wherein said variable impedance member consists of a variable resistor which is varied in accordance with the focal length of the interchangeable lens.

8. A camera with a program system and for use with interchangeable lenses having different focal lengths, comprising:
a light measuring means for producing an electrical signal corresponding to the amount of light from an object;
exposure value producing means for producing an electrical signal corresponding to the electrical signal from the light measuring means;
an electrical exposure factor determining means for determining a combination of shutter time and aperture value in accordance with the electrical signal from the exposure value determining means; and
a program curve adjusting means connected to the exposure factor determining means for varying the combination of shutter time and aperture value in such a manner that the shutter time value determined by the exposure factor determining means shortens as the focal length of an interchangeable lens mounted on the camera increases.

* * * * *